United States Patent [19]

Blackwell et al.

[11] 4,148,779

[45] Apr. 10, 1979

[54] WATER-DISPERSIBLE DYE/RESIN COMPOSITIONS

[75] Inventors: Samuel E. Blackwell; Kenneth R. Barton, both of Kingsport, Tenn.

[73] Assignee: Eastman Kodak Company, Rochester, N.Y.

[21] Appl. No.: 844,335

[22] Filed: Oct. 21, 1977

Related U.S. Application Data

[63] Continuation of Ser. No. 580,082, May 22, 1975, abandoned.

[51] Int. Cl.$^2$ .................. C09B 65/00; C09B 67/00
[52] U.S. Cl. ........................ 260/40 R; 8/92; 260/29.2 E; 260/40 P
[58] Field of Search ........... 260/29.2 E, 40 P, 75 S, 260/40 R; 8/92; 106/22

[56] References Cited

U.S. PATENT DOCUMENTS 2,176,423  10/1939  Jaeger ........................... 8/92 X
3,546,008  12/1970  Shields et al. ................. 428/395 X

*Primary Examiner*—Sandra M. Person
*Attorney, Agent, or Firm*—Donald W. Spurrell; Daniel B. Reece, III

[57] ABSTRACT

Disclosed are water-dispersible dye/resin compositions in solid, semi-solid or viscous liquid form, useful, for example, in the preparation of water-based heat transfer printing inks and aqueous dye dispersions for conventional dyeing. These compositions are solutions (this term as used herein encompasses true solution, colloidal dispersion and suspension) of disperse dyes in, for example, copolyesters of 5-sodiosulfoisophthalic acid optionally blended with certain aliphatic or cycloaliphatic dicarboxylic acids. Exemplary are solutions of dyes in the copolyesters of isophthalic acid, 5–20 mole % based on moles of glycol of 5-sodiosulfoisophthalic acid, and diethylene glycol. Aqueous dye dispersions can be made with these dye resin compositions without grinding of the dye beyond rough pulverization of the dye cake.

6 Claims, No Drawings

WATER-DISPERSIBLE DYE/RESIN COMPOSITIONS

This is a continuation of Application Ser. No. 580,082 filed May 22, 1975 and now abandoned.

This invention concerns solutions (term as used herein includes true solution, colloidal dispersion and suspension) of disperse dyes in water-dispersible copolyesters, such as those containing 5-sodiosulfoisophthalic acid moiety, in solid, semi-solid or viscous liquid form, which solutions are particularly useful for preparing water-based heat transfer printing inks.

In the manufacture of disperse dyes for use in heat transfer printing inks or for use in conventional dyeing, the customary practice is to grind or ball mill the disperse dye with dispersing aids for extended periods to reduce its primary particle to less than about 25 microns and insure at least a reasonably stable dye suspension in the aqueous bath. This procedure is costly, time consuming and inconvenient.

An object, therefore, of the present invention is to provide means and process for making stable dispersions of nonionic dyes in water without the aforesaid ball milling or grinding step. This and other objects hereinafter becoming evident have been attained in accordance with the present invention through the development of solutions or extremely fine dispersions of nonionic dyes in certain water-dispersible copolyester materials, which can be dissolved subsequently in water to give reasonably stable, homogeneous suspensions of dye in water.

It is quite surprising that large quantities of disperse dye can be dissolved in the water-dispersible resins and carried over into water in finely dispersed form by the simple step of dissolving the copolyester in water. A useful ratio of dye to resin is from about 1/20 to about 3/2 by weight, with the preferred ratio being from about 1/4 to about 4/3. The dye/resin compositions dispersed in water may be thickened with conventional thickening agents to produce printing pastes or inks suitable for textiles or paper.

Useful water-dispersible copolyesters and their preparations are described for example in U.S. Pat. Nos. 3,734,874 and 3,546,008, hereby incorporated by reference as a part of the present specification, particularly the dicarboxylic acids, the diols, the poly(ethylene glycols), and the dicarboxylic acids having the —SO$_3$M group, disclosed in Columns 3, 4 and 5 of each said patents. These copolyesters may be defined as water-dispersible polyester reaction products of at least one acid selected from aliphatic acids of from about 6 to about 30 carbons, cycloaliphatic acids of from about 4 to about 12 carbons, and aromatic dicarboxylic acids of from about 6 to about 14 carbons, a diol component of from about 2 to about 28 carbons, at least 20 mole percent of which is a poly(ethylene glycol) having the formula $$H-(OCH_2CH_2)_n-OH$$

wherein n is an integer of from 2 to about 14, and at least one dicarboxylic acid constituting from about 8 mole percent to about 45 mole percent of the total moles of said diol component and containing a —SO$_3$M group attached to an aromatic nucleus, wherein M is hydrogen or a metal ion.

The solutions or dispersions of dye in the copolyesters may be obtained by melt blending the dye with molten polymer. In such a process, dicarboxylic acids, preferably adipic, as described in U.S. Pat. No. 3,853,820, the disclosure of which is incorporated into this specification by reference, may be added in the desired quantity to adjust the polymer melt viscosity as detailed in Example 2 below. The melt viscosity of the system into which the dye is fed preferably should be between about 1000–2000 centipoise at the dye dissolution temperature selected which must be below the decomposition temperature of the dye but above the melting point of the aliphatic or alicyclic dicarboxylic acid.

A preferred blending technique is to roll mill the dye into softened polymer as detailed in Example 6 below, and thus obviate the need for adjusting melt viscosity with modifying acids. The roll milling is more fully described in copending U.S. patent application Ser. No. 560,760, in the names of Samuel E. Blackwell and Glenna B. Bowen, incorporated herein by reference. The gist of that process is that dye cake principally of a primary particle size of above about 50 microns is roll-milled with heat softenable polymeric material in the ratio of from about 1/40 to about 4/1 parts by weight of dye cake to polymeric material, wherein the roll gap is at least about 0.001 inch, and preferably more than about 0.06 inch, for a sufficient period to obtain a significant reduction in dye particle size. In the present invention, the dye will actually dissolve in the copolyester. The roll gap may be as in commercial size equipment, up to ½ inch or more depending on the viscosity and feed rate of the copolyester, and canted rolls, where the gap is wider on one end than on the other, may be employed.

The present invention may be defined as water-dispersible compositions comprising:

(A) from about 5 to about 60% by weight of disperse dye, and (B) from about 95 to about 40% by weight of linear, water-dispersible copolyester, or (C) from 95 to about 40% by weight of a blend of the copolyester of (B) with up to about 40% by weight based on total weight of said blend of a saturated aliphatic or cycloaliphatic dicarboxylic acid having 6 to 12 carbon atoms, said copolyester being comprised of (D) at least one aliphatic, cycloaliphatic or aromatic dicarboxylic acid component, (E) a diol component of from about 2 to about 28 carbons, at least about 20 mole percent of which is a poly(ethylene glycol) having the formula H—OH wherein n is an integer of from 2 to about 14, and (F) at least one difunctional dicarboxylic acid containing a —SO$_3$M group attached to an aromatic nucleus, wherein M is hydrogen, Na+, Li+ or K+, and constituting at least about 8 mole percent to about 45 mole percent of the total moles of components (D) and (F).

The dye/resin compositions in, for example, chip form of any convenient size and shape may be dispersed in water directly from a molten state, or alternatively, the solutions may be cooled and solidified, broken into convenient sized chips, and dispersed in water at some later time. The solutions prepared by roll milling may also be cooled and broken into chips as in Example 6. In either case, the compositions of this invention provide a unique and novel means for dispersing water-insoluble disperse dyes in water to obtain a very small dye particle size without the necessity of an extensive grinding or ball milling operation.

The water-dispersible copolyesters of 5-sodiosulfoisophthalic acid may be melt or otherwise blended with conventional additives, such as up to about 15% by weight of antiblocking agents including $C_{12}$–$C_{22}$ fatty acids and derivatives thereof, to facilitate storage of the dye/resin solution in chip or granular form. Examples of such fatty acids are stearic, oleic, and palmitic. Derivatives of fatty acids such as amides, esters and imidazolines also may be used. Such derivatives include methyl, palmitate, stearamide, 12-hydroxystearic acid, and N,N'-ethylene bisstearamide. The preferred antiblocking agent is stearic acid. Small amounts of pigments such as talc also may be used in the blend to reduce the blocking tendency of chips or granules thereof. Minor amounts of up to about 10% by weight of other additives such as antistatic agents and antioxidants may also be incorporated into the copolyester per se or the resin blend to achieve desired results.

Specifically, the preferred water-dispersible polyesters useful in the practice of this invention are reaction products of isophthalic acid, 5-sodiosulfoisophhthalic acid, and poly(oxyethylene glycols). A preferred group of copolyesters are comprised of an acid component comprising 80–90 mole % of isophthalic acid, 5–20 mole % of 5-sodiosulfoisophthalic acid, and diethylene glycol as the diol. Most preferred polyesters include the copolyesters of 90–92 mole % isophthalic acid and 8–10 mole % 5-sodiosulfoisophthalic acid as the acid moiety, and diethylene glycol, and the copolyesters of isophthalic acid with 13–17 mole % of 5-sodiosulfoisophthalic acid, and diethylene glycol with 28–32 mole % of 1,4-cyclohexanedimethanol. Listed in the following Table I are examples of useful copolyesters.

TABLE I

| Dicarboxylic Acid | Mole Percent | Sulfonate | Mole Percent | Diol | Mole Percent | I.V. |
|---|---|---|---|---|---|---|
| Isophthalic | 52.5) | | 7.5 | DEG[12] | 100 | 0.54 |
| Terephthalic | 25) | SIP | | | | |
| Hexahydroisophthalic | 15) | | | | | |
| Isophthalic | 90 | SIP | 10 | DEG | 100 | 0.53 |
| Hexahydroterephthalic | 90 | SIP | 10 | DEG | 100 | 0.73 |
| Isophthalic | 50) | | | (DEG | 80) | |
| Terephthalic | 25) | SIP | 10 | (EG[3] | 20) | 0.60 |
| Hexahydroisophthalic | 15) | | | | | |
| Isophthalic | 50) | | | | | |
| Terephthalic | 25) | (4) | 10 | DEG | 100 | 0.42 |
| Hexahydroisophthalic | 15) | | | | | |
| Isophthalic | 90 | (5) | 10 | DEG | 100 | 0.48 |
| Isophthalic | 60) | (5) | 10 | DEG | 100 | 0.55 |
| Hexahydroterephthalic | 30) | | | | | |
| Isophthalic | 90 | (6) | 10 | DEG | 100 | 0.42 |
| Terephthalic | 92 | SIP | 8 | TEG[7] | 100 | 0.33 |
| Isophthalic | 92 | SIP | 8 | TEG | 100 | 0.59 |
| | | | | (CHDM[8] | 30) | |
| "90 | | SIP | 10 | (DEG | 70) | 0.45 |
| Adipic | 90 | SIP | 10 | DEG | 100 | 0.69 |
| | | | | (CHDM | 50) | |
| Isophthalic | 90 | SIP | 10 | (DEG | 50) | 0.48 |
| | | | | (CHDM | 60) | |
| " | 90 | SIP | 10 | (DEG | 40) | 0.51 |
| | | | | (CHDM | 70) | |
| "80 | | SIP | 20 | (DEG | 30) | 0.32 |
| | | | | (CHDM | 60) | 0.38 |
| ∝ 80 | | SIP | 20 | (DEG | 40) | |

[1]SIP—5-sodiosulfoisophthalic acid.
[2]DEG—diethylene glycol.
[3]EG—ethylene glycol.
[4]4-sodiosulfophenyl-3,5-dicarboxybenzene sulfonate.

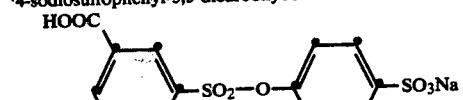

[5]5-[4-(sodiosulfo)phenoxy]isophthalic acid.

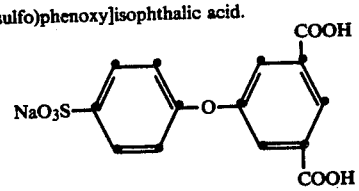

[6]2(2-sodiosulfophenyl)-2-ethylmalonic acid.

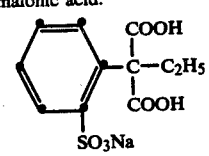

[7]TEG—triethylene glycol.

TABLE I-continued

| Dicarboxylic Acid | Mole Percent | Sulfonate | Mole Percent | Diol | Mole Percent | I.V. |
|---|---|---|---|---|---|---|
| [8]CHDM--1,4-cyclohexanedimethanol. | | | | | | |

Dyes useful in this invention are those classified by the Colour Index as disperse colors. They may be of any chemical class such as ezo, anthraquinone, methine, and disazo, which are characterized by the absence of any pendant water solubilizing groups such as a sulfonic acid group or a salt thereof. Of particular interest for heat transfer printing uses are those dyes which sublime readily at 180°–230° C., exemplified by C.I. Disperse Yellow 3, Disperse Yellow 85, Disperse Yellow 23, Disperse Orange 25, Disperse Red 60, Disperse Red 4, Disperse Red 78, Disperse Violet 1, Disperse Violet 27, Disperse Blue 3, Disperse Blue 14, and Disperse Blue 35.

Two or more disperse dyes may be blended in the same resin, if desired, to produce a resultant color, provided that no adverse chemical reaction between the dyes or the resin occurs at the dye dissolution temperature. Alternatively, two or more dye/resin solutions may be dispersed in the same printing paste.

EXAMPLE 1—Preparation of Water-Dispersible Resin

Sixty parts of the 90/10 copolyester of isophthalic acid/5-sodiosulfoisophthalic acid, and diethylene glycol (inherent viscosity 0.39) are mixed with 40 parts of adipic acid and 10 parts of stearic acid at 165° C. under an atmosphere of dry nitrogen until all solid materials have melted and the blend is homogeneous. The blend is then extruded onto granules of solid carbon dioxide and ground to about 3 mm. particle size in a Wiley mill. The inherent viscosity of the blend corrected for the low-molecular-weight diluents, adipic and stearic acids, is 0.38.

In the same manner as described above, the resin blends shown in Table II below are prepared.

Table II

Examples of Resins Useful for Preparing Water-Dispersible Solutions of Dyes

| Resin No. | Water-Dispersible Polyester | Parts by Wt. | Dicarboxylic Acid | Parts by Wt. | Antiblocking Agent | Parts by Wt. |
|---|---|---|---|---|---|---|
| 1 | 90/10 isophthalic acid/5-sodiosulfoisophthalic acid and diethylene glycol | 60 | Adipic | 40 | Stearic acid | 10 |
| 2 | 90/10 isophthalic acid/5-sodiosulfoisophthalic acid and diethylene glycol | 60 | Sebacic | 40 | — | — |
| 3 | 90/10 isophthalic acid/5-sodiosulfoisophthalic acid and dietylene glycol | 60 | Adipic | 40 | — | — |
| 4 | 92/8 isophtahlic acid/5-sodio-sulfoisophthalic acid and diethylene glycol | 55 | Adipic | 45 | Palmitic acid | 5 |
| 5 | 92/8 isophthalic acid/5-sodiosulfoisophthalic acid and diethylene glycol | 60 | Azelaic | 40 | N,N'-ethylene bisstearamide | 2.5 |
| 6 | 92/8 isophthalic acid/5-sodiosulfoisophthalic acid and diethylene glycol | 70 | Adipic | 30 | Talc | 5 |
| 7 | 90/10 isophthalic acid/5-(4-sodiosulfophenoxy)isophthalic acid and triethylene glycol | 50 | Cyclohexane 1,3-dicarboxylic acid | 50 | Stearic | 2 |
| 8 | 90/10 isophthalic acid/5-sodiosulfoisophthalic acid and diethylene glycol | 100 | — | — | — | — |
| 9 | 90/10 isophthalic acid/5-sodiosulfoisophthalic acid and diethylene glycol | 30 | Adipic | 70 | — | — |
| 10 | 90/10 isophthalic acid/5-sodiosulfoisophthalic acid and diethylene glycol | 80 | Adipic | 20 | — | — |
| 11 | 85/15 isophthalic acid/5-sodiosulfoisophthalic acid and 70/30 diethylene glycol and 1,4-cyclohexanedimethanol | 100 | — | — | — | — |

EXAMPLE 2

Two parts of resin 1 described in Table II are melted at 165° C. under a dry nitrogen atmosphere. One part of C.I. Disperse Red 60 dye containing no dispersing agent or other diluent is slowly added with stirring and allowed to mix until all the dye is fully dissolved. The molten solution is poured out onto a Teflon base and allowed to cool, forming a solid sheet which can be granulated readily. Two grams of this solid solution of dye are dispersed in 120 ml. water at 80° C. A stable dispersion is formed in about 20 minutes and 2.8 g. of high viscosity hydroxyethyl cellulose is dissolved in the mixture to form a thick paste ink suitable for screen printing. When the ink has cooled to room temperature, screen prints are made onto paper sheets and allowed to dry. Heat transfer prints are made by contacting this paper with 100% polyester fabric under 2–6 lb./in$^2$ pressure for 30 sec. at 210° C. Sharp, clear prints with good dye transfer are obtained. The prints are fast to light, washing, and rubbing.

EXAMPLE 3

A dye dispersion and transfer print are prepared as in Example 2 except that the pulverized resin and dye are dry mixed together before melting. Results identical to those of Example 2 are obtained.

EXAMPLE 4

A dye dispersion and transfer print are prepared as in Example 2 except that the dye used is full strength C.I. Disperse Yellow 3. A stable ink results and the transfer print on 100% polyester is fast to light, washing, and rubbing.

EXAMPLE 5

In the manner described in Example 2, the resins and dyes listed in Table III are mixed to form water-dispersible dye/resin compositions. Aqueous heat transfer printing inks are prepared from each composition, screen printed on transfer paper and transferred to 100% polyester fabric as described in Example 2. The printed colors are fast to light, washing and rubbing.

Table III

Water Dispersible Solid Dye/Resin Compositions for Heat Transfer Inks

| Resin No.* | Parts by Wt. | Disperse Dye | Parts by Wt. |
|---|---|---|---|
| 8 | 2 | C.I. Disperse Red 60 | 1 |
| 9 | 2 | C.I. Disperse Red 60 | 1 |
| 10 | 2 | C.I. Disperse Red 60 | 1 |
| 3 | 2 | C.I. Disperse Red 60 | 1 |
| 1 | 2 | C.I. Disperse Violet 27 | 1 |
| 3 | 2 | C.I. Disperse Violet 27 | 1 |
| 3 | 2 | C.I. Disperse Red 65 | 1 |

*From Table II

The compositions of this invention also may be prepared as aforesaid by two roll milling as described below, a dry blend of polymer and dye at a temperature above the softening point of the polymer but below the decomposition temperatures of the dye. The dye dissolves or disperses in the polymer during this process and the resulting product appears identical in performance to the product obtained as described earlier herein.

EXAMPLE 6

Two parts of resin 1 of Table II are blended with 1 part C.I. Disperse Red 60 dye cake. This blend is milled by slowly depositing the dry pulverized materials onto a two roll mill operating at 88° C. front roll temperature, 49° C. back roll temperature, roll surface speed 10.2 meters/min., allowing the material to band, then continuing mixing for about 5 minutes in the usual manner. The dye/resin composition is stripped from the mill, allowed to cool to room temperature and broken into small pieces. Aqueous dye dispersion, ink and transfer print are prepared as in Example 2 with identical results.

EXAMPLE 7

Two parts of resin 8 of Table II are blended with 1 part C.I. Disperse Red 60 dye cake. This blend is processed as in Example 6 with identical results.

The invention has been described in detail with particular reference to preferred embodiments thereof, but it will be understood that variations and modifications can be effected within the spirit and scope of the invention.

We claim:

1. A water-dispersible dye/resin composition comprising
   (A) from about 5 to about 60% by weight of disperse dye, and
   (B) from about 95 to about 40% by weight of linear, water-dispersible copolyester, or
   (C) from 95 to about 40% by weight of a blend of (B) with a saturated aliphatic or cycloaliphatic dicarboxylic acid having from about 6 to about 14 carbon atoms, wherein said acid comprises up to about 70% by weight of said blend,
   said water-dispersible copolyester being comprised of
   (D) at least one dicarboxylic acid selected from aliphatic of from about 6 to about 30 carbons, cycloaliphatic of from about 4 to about 12 carbons, and aromatic of from about 6 to about 14 carbons,
   (E) at least one diol component of from about 2 to about 28 carbons, at least about 20 mole percent of which is a poly(ethylene glycol) having the formula $H-(OCH_2CH_2)_nOH$ wherein n is an integer of from 2 to about 14, and
   (F) at least one dicarboxylic acid containing a $-SO_3M$ group attached to an aromatic nucleus of from about 6 to about 14 carbons, wherein M is $H^+$, $Na^+$, $Li^+$ or $K^+$, and constituting from about 8 mole % to about 45 mole % of the total moles of components (D) and (F).

2. The system of claim 1 wherein the copolyester acid moiety is comprised of 90–92 mole % isophthalic acid and 8–10 mole % 5-sodiosulfoisophthalic acid, and the diol is diethylene glycol.

3. The system of claim 1 wherein the copolyester acid moiety is comprised of 87–83 mole % isophthalic acid and 13–17 mole % 5-sodiosulfoisophthalic acid, and the glycol moiety is comprised of 72–68 mole % diethylene glycol and 28–32 mole % 1,4-cyclohexanedimethanol.

4. A color chip of the composition of claim 1.

5. A heat transfer printing ink prepared from the dye/resin composition of claim 1.

6. Aqueous dye dispersions prepared from the composition of claim 1.

* * * * *